(12) United States Patent
Hirose (10) Patent No.: US 10,619,673 B2
(45) Date of Patent: Apr. 14, 2020

(54) ROLLING BEARING

(71) Applicant: JTEKT CORPORATION, Osaka-shi, Osaka (JP)

(72) Inventor: Michiru Hirose, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/234,961

(22) Filed: Dec. 28, 2018

(65) Prior Publication Data

US 2019/0211873 A1  Jul. 11, 2019

(30) Foreign Application Priority Data

Jan. 10, 2018 (JP) ................. 2018-002066

(51) Int. Cl.
    *F16C 33/66*      (2006.01)
    *F16C 33/58*      (2006.01)
    *F16C 19/36*      (2006.01)

(52) U.S. Cl.
    CPC ........ *F16C 33/6659* (2013.01); *F16C 19/364* (2013.01); *F16C 33/58* (2013.01); *F16C 33/586* (2013.01); *F16C 33/6681* (2013.01); *F16C 33/6685* (2013.01)

(58) Field of Classification Search
    CPC ...... F16C 33/58; F16C 33/583; F16C 33/585; F16C 33/586; F16C 33/6659; F16C 33/6666; F16C 33/6674; F16C 33/6681; F16C 19/364
See application file for complete search history.

(56) References Cited

U.S. PATENT DOCUMENTS

| | | | | |
|---|---|---|---|---|
| 2,709,567 A | * | 5/1955 | Wood ..................... | F01D 25/125 415/115 |
| 2,849,262 A | * | 8/1958 | Wood, Jr. ............ | F16C 33/6662 384/468 |
| 3,186,779 A | * | 6/1965 | Chapman .............. | F01D 25/164 384/535 |
| 4,400,040 A | * | 8/1983 | Toth ...................... | F16C 19/364 384/465 |
| 5,150,975 A | * | 9/1992 | Major ................... | F16C 33/664 384/465 |
| 5,334,013 A | * | 8/1994 | Meller .................... | A61C 1/05 415/904 |
| 5,499,901 A | * | 3/1996 | Rockwood ............ | F04D 29/061 277/412 |

(Continued)

FOREIGN PATENT DOCUMENTS

JP      2008-089040 A      4/2008

*Primary Examiner* — Alan B Waits
(74) *Attorney, Agent, or Firm* — Oliff PLC (57) ABSTRACT

A rolling bearing includes an inner ring that rotates together with a rotary shaft, an outer ring, a plurality of tapered rollers, and an oil discharge portion provided on one side of the inner ring in the axial direction and that rotates together with the inner ring. The oil discharge portion has a wall portion in a circular plate shape that partially covers an annular space formed between the inner ring and the outer ring, and a plurality of blade portions that are provided on a side surface of the wall portion and that rotate together with the inner ring to cause lubricating oil to flow at least radially inward toward the rotary shaft, radially outward, or toward the one side in the axial direction.

7 Claims, 10 Drawing Sheets

(56) References Cited

U.S. PATENT DOCUMENTS

| | | | | |
|---|---|---|---|---|
| 5,826,986 A * | 10/1998 | Adkins | ................... | F16C 33/76 |
| | | | | 384/472 |
| 2004/0202536 A1* | 10/2004 | Macfadyen | ........... | F01D 25/125 |
| | | | | 415/111 |
| 2006/0120646 A1* | 6/2006 | Suzuki | .................. | F04B 1/0404 |
| | | | | 384/470 |
| 2013/0266250 A1* | 10/2013 | Brown | ................ | F16C 33/3887 |
| | | | | 384/470 |
| 2016/0032970 A1* | 2/2016 | Dehne | .................... | F16C 17/18 |
| | | | | 384/293 |

* cited by examiner

ROLLING BEARING

INCORPORATION BY REFERENCE

The disclosure of Japanese Patent Application No. 2018-002066 filed on Jan. 10, 2018 including the specification, drawings and abstract, is incorporated herein by reference in its entirety.

BACKGROUND OF THE INVENTION

1. Field of the Invention

The present invention relates to a rolling bearing.

2. Description of the Related Art

Figure 11:
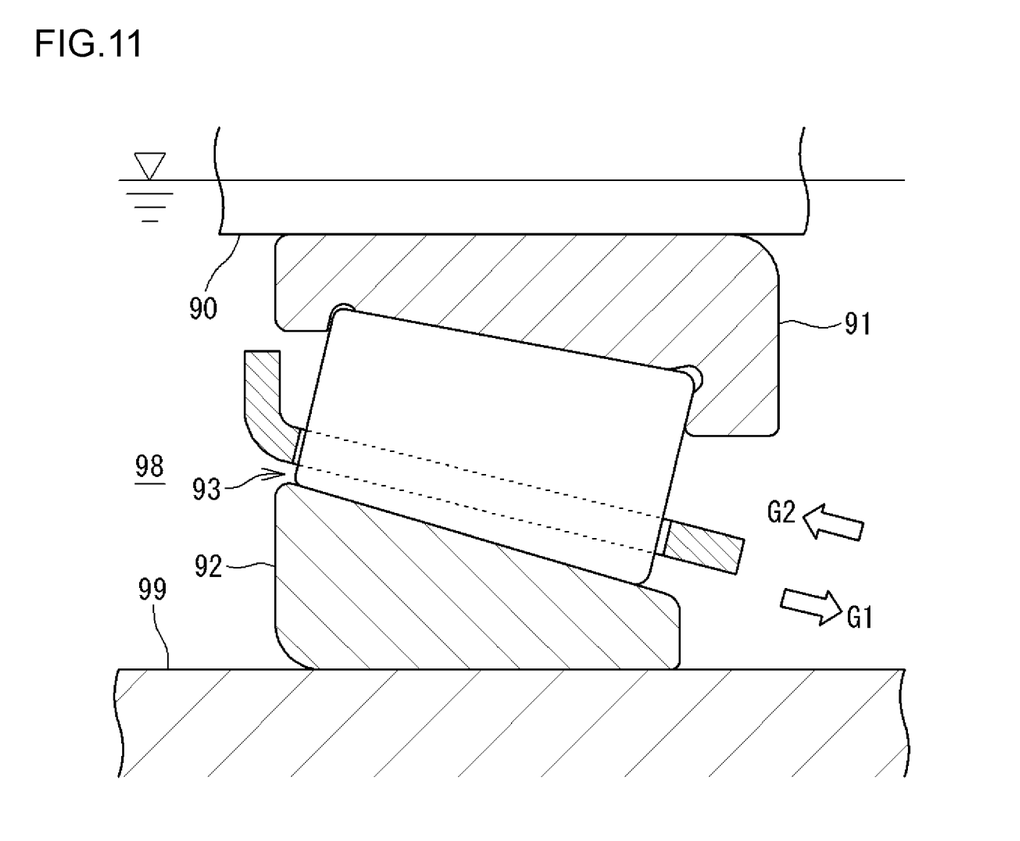
FIG. 11 is a sectional view of a tapered roller bearing according to the related art.

Rolling bearings are widely used to support a shaft that rotates. A rolling bearing has an inner ring, an outer ring, and a plurality of rolling elements provided between the inner ring and the outer ring. It is known that, in the case of a tapered roller bearing (see FIG. 11), for example, a pump effect in which lubricating oil 98 flows from the left side toward the right side of FIG. 11 is caused when an inner ring 91 rotates together with a rotary shaft 90 (see paragraph [0030] of Japanese Patent Application Publication No. 2008-89040 (JP 2008-89040 A), for example). The lubricating oil 98 in an annular space 93 formed between the inner ring 91 and an outer ring 92 is discharged toward the right side of FIG. 11 by the pump effect. The direction in which the lubricating oil 98 in the annular space 93 is discharged is indicated by an arrow G1 in FIG. 11.

The lower portion of the tapered roller bearing (rolling bearing) is occasionally immersed in the lubricating oil 98 which is accumulated in a housing 99 as illustrated in FIG. 11. That is, the tapered roller bearing (rolling bearing) is occasionally under oil bath lubrication. In that event, the lubricating oil 98 in the annular space 93, which has once been discharged out of the bearing toward the right side of FIG. 11 by the pump effect, is occasionally returned to the annular space 93 (in the case where the pump effect is weak, for example). The direction in which the lubricating oil 98 is returned to the annular space 93 is indicated by an arrow G2 in FIG. 11.

When the lubricating oil 98 is returned to the annular space 93, the stirring torque is increased if much lubricating oil 98 is present in the annular space 93. If the stirring torque is increased, the bearing temperature may be raised, for example.

The pump effect is also caused in rolling bearings other than tapered roller bearings. Also in rolling bearings in which the pump effect is not caused, the stirring torque may be increased if much lubricating oil is present in an annular space between an inner ring and an outer ring, in particular in the case of oil bath lubrication.

SUMMARY OF THE INVENTION

It is an object of the present invention to provide a rolling bearing with an enhanced function of discharging lubricating oil in an annular space.

An aspect of the present invention provides a rolling bearing including: an inner ring that rotates together with a rotary shaft; an outer ring; a plurality of rolling elements provided between the inner ring and the outer ring; and an oil discharge portion provided on one side of the inner ring in an axial direction to rotate together with the inner ring, in which the oil discharge portion has a wall portion in a circular plate shape that partially covers an annular space formed between the inner ring and the outer ring, and a plurality of blade portions that are provided on a side surface of the wall portion and that rotate together with the inner ring to cause lubricating oil to flow at least radially inward toward the rotary shaft, radially outward, or toward the one side in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
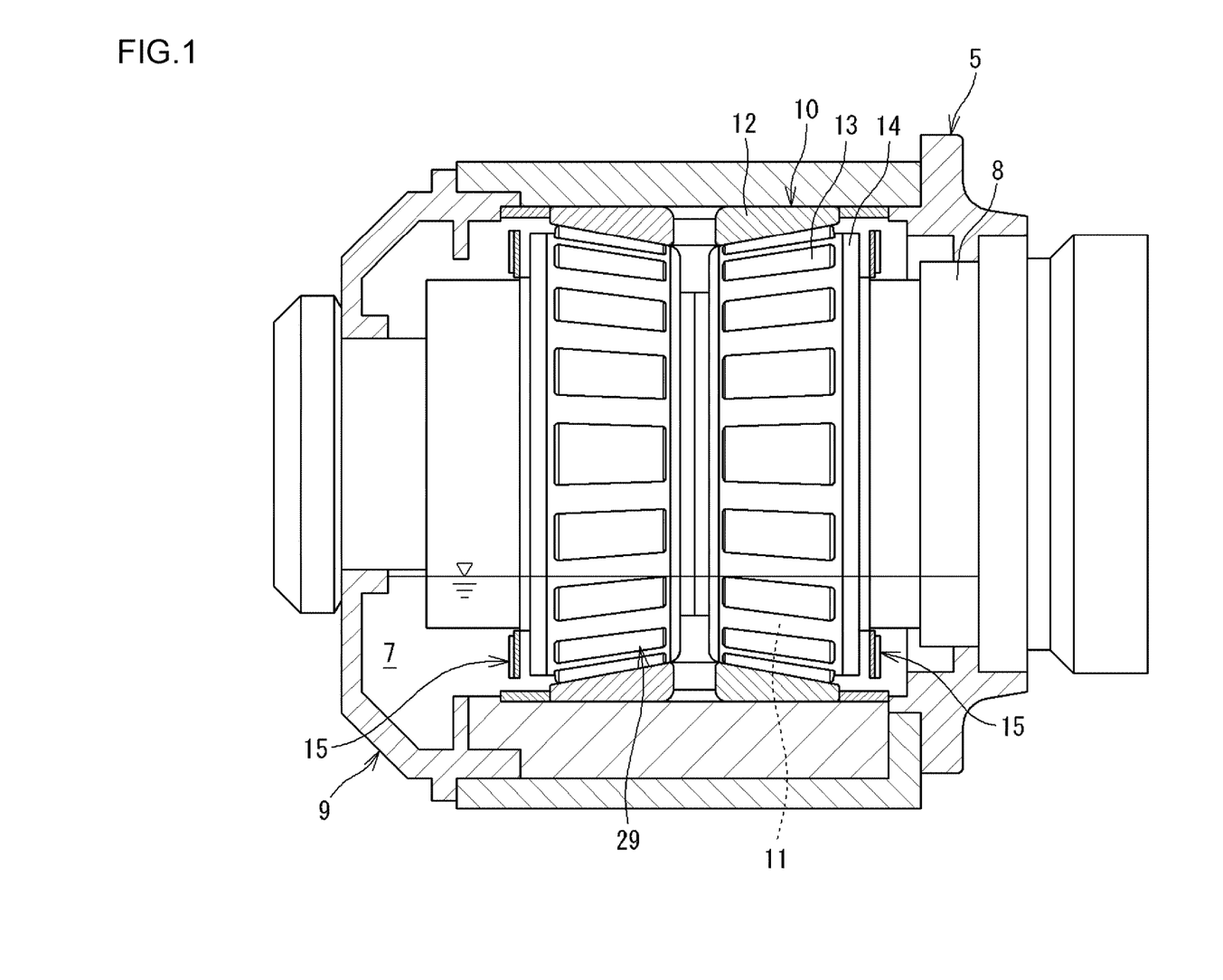
FIG. 1 is a sectional view of a rotary device that includes a rolling bearing according to the present invention.
Figure 2:
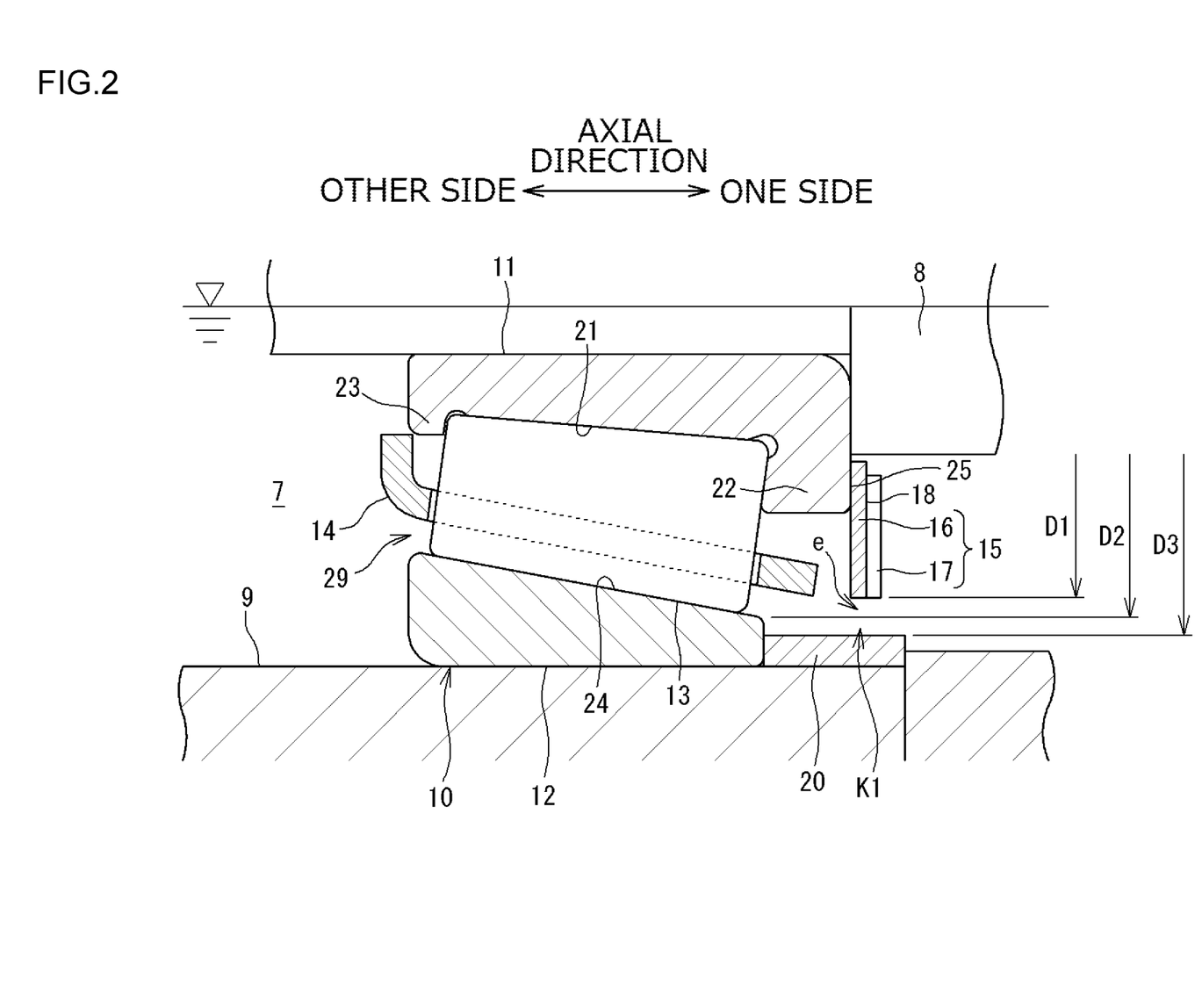
FIG. 2 is a sectional view of a bearing portion on the right side of the rolling bearing illustrated in FIG. 1.

FIG. 1 is a sectional view of a rotary device 5 that includes a rolling bearing according to the present invention. A rolling bearing 10 according to the present embodiment is a double-row tapered roller bearing. The rolling bearing 10 rotatably supports a rotary shaft 8 provided in a housing 9. The lower portion of the rolling bearing 10 is immersed in lubricating oil 7 accumulated in the housing 9. That is, the rolling bearing 10 is of an oil bath lubrication type. The rolling bearing (double-row tapered roller bearing) 10 illustrated in FIG. 1 is shaped symmetrically in the right-left direction. FIG. 2 is a sectional view of a bearing portion on the right side of the rolling bearing 10 illustrated in FIG. 1. In FIG. 2, for ease of illustration, a bearing portion on the right side of the rolling bearing 10 illustrated in FIG. 1 is illustrated as an independent single-row rolling bearing 10.

As illustrated in FIG. 2, the rolling bearing 10 includes an inner ring 11, an outer ring 12, and a plurality of tapered rollers 13 provided between the inner ring 11 and the outer ring 12. The rolling bearing 10 includes an annular cage 14. The cage 14 holds the plurality of tapered rollers 13 at intervals along the circumferential direction. The rolling bearing 10 further includes an oil discharge portion 15 provided on one side of the inner ring 11 in the axial direction.

In the embodiment illustrated in FIG. 2, the outer ring 12 has an extension tubular portion 20 that extends in the axial direction toward one side in the axial direction farther than a side surface 25 of the inner ring 11 on one side in the axial direction. The extension tubular portion 20 illustrated in FIG. 2 is constituted of a cylindrical member, and is a member that is separate from the outer ring 12. The extension tubular portion 20 may be constituted of a member that is the same as the outer ring 12 (i.e. the extension tubular portion 20 may be a part of the outer ring 12). The extension tubular portion 20 is provided so as to extend toward one side in the axial direction farther than the oil discharge portion 15. An inside diameter D3 of the extension tubular portion 20 is larger than an outside diameter D1 of the oil discharge portion 15 (a wall portion 16 in a circular plate shape to be discussed later) (D3>D1). A gap e is formed between the wall portion 16 of the oil discharge portion 15 and the extension tubular portion 20. The extension tubular portion 20 may be omitted depending on the form of the oil discharge portion 15 (see FIG. 7).

As illustrated in FIG. 2, the inner ring 11 is an annular member externally fitted with the rotary shaft 8 to rotate together with the rotary shaft 8. The inner ring 11 has a cone back face rib (hereinafter referred to as a large rib) 22 provided on one side in the axial direction to project radially outward, and a cone front face rib (hereinafter referred to as a small rib) 23 provided on the other side in the axial direction to project radially outward. The large rib 22 is larger in outside diameter than the small rib 23. The inner ring 11 has an inner raceway surface 21 which is provided on the outer peripheral side of the inner ring 11 and with which the tapered rollers 13 make rolling contact (on which the tapered rollers 13 roll). The inner raceway surface 21 is shaped so as to be reduced in diameter from one side in the axial direction toward the other side in the axial direction.

The outer ring 12 is an annular member attached to the housing 9. The outer ring 12 has an outer raceway surface 24 which is provided on the inner peripheral side of the outer ring 12 and with which the tapered rollers 13 make rolling contact (on which the tapered rollers 13 roll). The outer raceway surface 24 is shaped so as to be reduced in diameter from one side in the axial direction toward the other side in the axial direction.

When the thus configured tapered roller bearing 10 (inner ring 11) is rotated, an effect (hereinafter referred to as a "pump effect") that causes the lubricating oil 7 to flow from the other side in the axial direction toward one side in the axial direction is caused in an annular space 29 formed between the inner ring 11 and the outer ring 12. The pump effect is caused as the lubricating oil 7 is moved radially outward by a centrifugal force due to rotation of the inner ring 11 and the cage 14 and the lubricating oil 7 is further moved toward one side in the axial direction along the outer raceway surface 24. The small rib 23 side of the inner ring 11 is referred to as a "small end side". The large rib 22 side of the inner ring 11 is referred to as a "large end side". The lubricating oil 7 in the annular space 29 is caused to flow from the small end side toward the large end side by the pump effect. A bearing portion on the left side of the rolling bearing 10 illustrated in FIG. 1 has the same configuration as that illustrated in FIG. 2 (although symmetric in the right-left direction). The lubricating oil 7 in the annular space 29 is caused to flow from the small end side toward the large end side by the pump effect. Therefore, an effect that discharges the lubricating oil 7, which is accumulated at the bottom portion of the housing 9 and present in the annular space 29, toward both sides in the axial direction is caused when the inner ring 11 is rotated.

In the rolling bearing 10 illustrated in FIG. 1, an oil discharge portion 15 is provided on the large end side of the inner ring 11 of the bearing portion (see FIG. 2) on the right side. An oil discharge portion 15 is also provided on the large end side of the inner ring 11 of the bearing portion on the left side (see FIG. 1). The oil discharge portions 15 enhance the function of discharging the lubricating oil 7 in the annular space 29. The specific configuration and the function of the oil discharge portion 15 will be described below.

As illustrated in FIG. 2, the oil discharge portion 15 is provided on the large end side of the inner ring 11, and rotates together with the inner ring 11. The oil discharge portion 15 has the wall portion 16 in a circular plate shape and a plurality of blade portions 17. The wall portion 16 illustrated in FIG. 2 is a member in a ring plate shape fixed to the side surface 25 of the inner ring 11. The wall portion 16 may be constituted of a member that is the same as the inner ring 11 (i.e. the wall portion 16 may be a part of the inner ring 11), rather than being separate from the inner ring 11. The outside diameter D1 of the wall portion 16 is smaller than an inside diameter D2 of the inner peripheral surface (outer raceway surface 24) of the outer ring 12 at an end portion on one side in the axial direction (D1<D2). Consequently, the wall portion 16 partially covers the annular space 29 from one side in the axial direction. The annular space 29 opens partially in the axial direction, and radially outward, in a region K1 on one side in the axial direction. The relationship "D1<D2" between the outside diameter D1 and the inside diameter D2 is not essential, and the outside diameter D1 may be equal to or more than the inside diameter D2 (D1≥D2).

Figure 3:
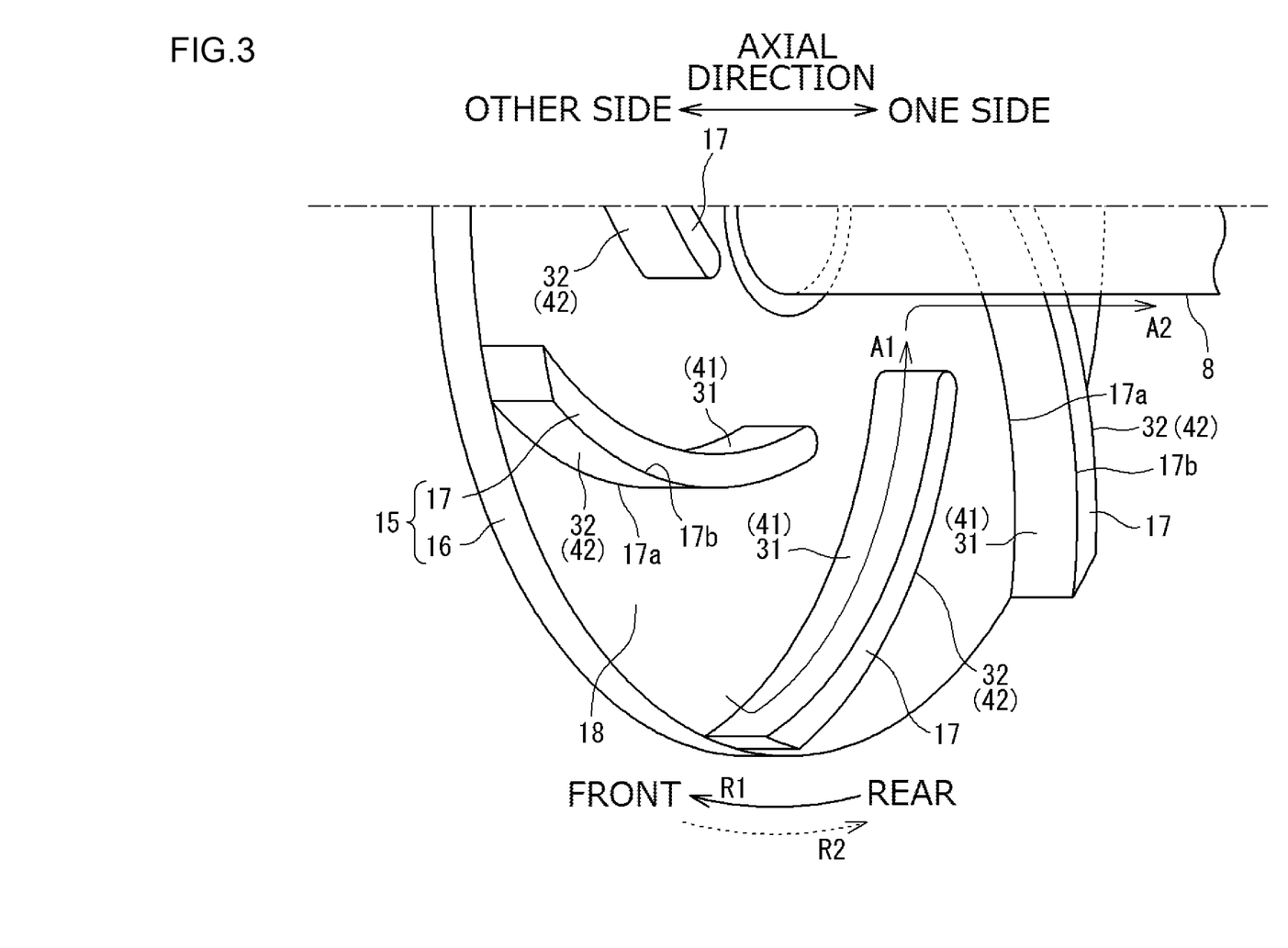
FIG. 3 is a perspective view illustrating the lower half of an oil discharge portion.

The blade portions 17 are provided on a side surface 18 of the wall portion 16 that faces one side in the axial direction. FIG. 3 is a perspective view illustrating the lower half of the oil discharge portion 15. A plurality of blade portions 17 are provided on the wall portion 16 at intervals in the circumferential direction. The blade portions 17 project in the axial direction from the side surface 18. The rotational direction of the oil discharge portion 15 is the same as the rotational direction of the inner ring 11. In FIG. 3, the rotational direction of the oil discharge portion 15 is indicated by a continuous arrow R1. The direction opposite to the rotational direction of the oil discharge portion 15 is indicated by a dashed arrow R2. In each of the blade portions 17, a first side surface 41 that faces the front side in the rotational direction (direction of the arrow R1) serves as a blade surface (first blade surface) 31 that applies thrust to the lubricating oil 7. The blade surface 31 extends in the direction (direction of the arrow R2) opposite to the rotational direction toward the radially inner side.

When the oil discharge portion 15 which has such blade portions 17 is rotated in the direction of the arrow R1 together with the inner ring 11, the lubricating oil 7 around the blade portions 17 flows radially inward toward the rotary shaft 8 (arrow A1 in FIG. 3) in the region K1 (see FIG. 2) on one side in the axial direction. When the lubricating oil 7 flows radially inward in this manner, the lubricating oil 7 hits the outer peripheral surface of the rotary shaft 8, and is redirected to flow toward one side in the axial direction (arrow A2 in FIG. 3). With this flow of the lubricating oil 7, the lubricating oil 7 in the space on the radially outer side of the wall portion 16 is decreased. As a result, the lubricating oil 7 in the annular space 29 is discharged toward one side in the axial direction.

Figure 4:
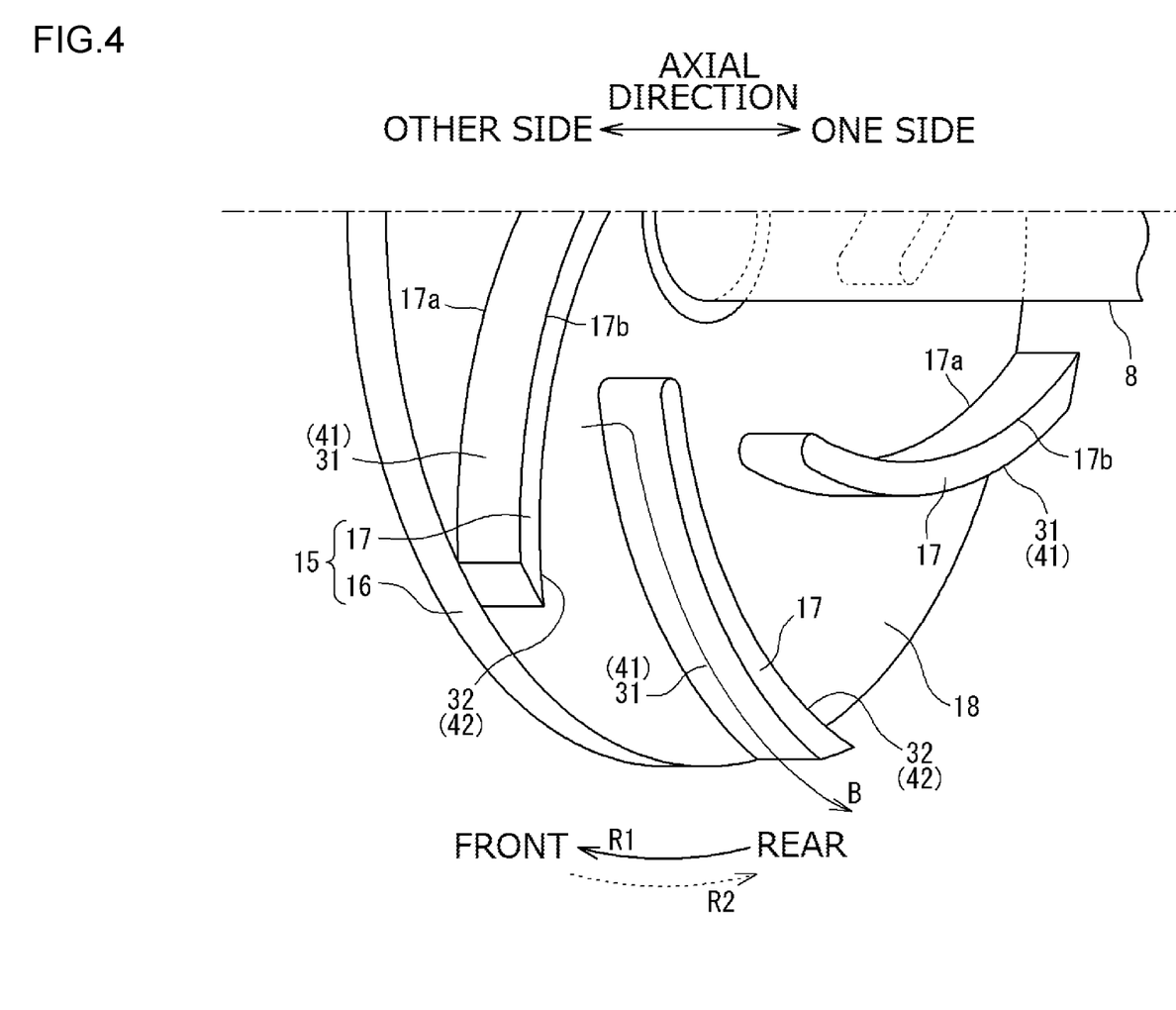
FIG. 4 is a perspective view illustrating the lower half of an oil discharge portion with blade portions according to a different embodiment.

FIG. 4 is a perspective view illustrating the lower half of the oil discharge portion 15 with blade portions 17 according to a different embodiment. The blade portions 17 are provided on a side surface 18 of the wall portion 16 that faces one side in the axial direction. The plurality of blade portions 17 are provided on the wall portion 16 at intervals in the circumferential direction. The blade portions 17 project in the axial direction from the side surface 18. In FIG. 4, the rotational direction of the oil discharge portion 15 is indicated by a continuous arrow R1. The direction opposite to the rotational direction of the oil discharge portion 15 is indicated by a dashed arrow R2. In each of the blade portions 17, a first side surface 41 that faces the front side in the rotational direction (direction of the arrow R1) serves as a blade surface (first blade surface) 31 that applies thrust to the lubricating oil 7. The blade surface 31 extends in the direction (direction of the arrow R2) opposite to the rotational direction toward the radially outer side.

When the oil discharge portion 15 which has such blade portions 17 is rotated in the direction of the arrow R1 together with the inner ring 11, the lubricating oil 7 flows radially outward (arrow B in FIG. 4) away from the rotary shaft 8 in the region K1 (see FIG. 2) on one side in the axial direction. When the lubricating oil 7 flows radially outward in this manner, the lubricating oil 7 hits the inner peripheral surface of the extension tubular portion 20 (inner peripheral surface of the housing 9), and is redirected to flow toward one side in the axial direction. With this flow of the lubricating oil 7, the lubricating oil 7 in the space on the radially outer side of the wall portion 16 flows toward one side in the axial direction to be decreased. As a result, the lubricating oil 7 in the annular space 29 is discharged toward one side in the axial direction.

Each of the blade portions 17 illustrated in FIG. 4 (and FIG. 3) has an arcuate shape as seen in the axial direction, but may have a straight shape.

Figure 5:
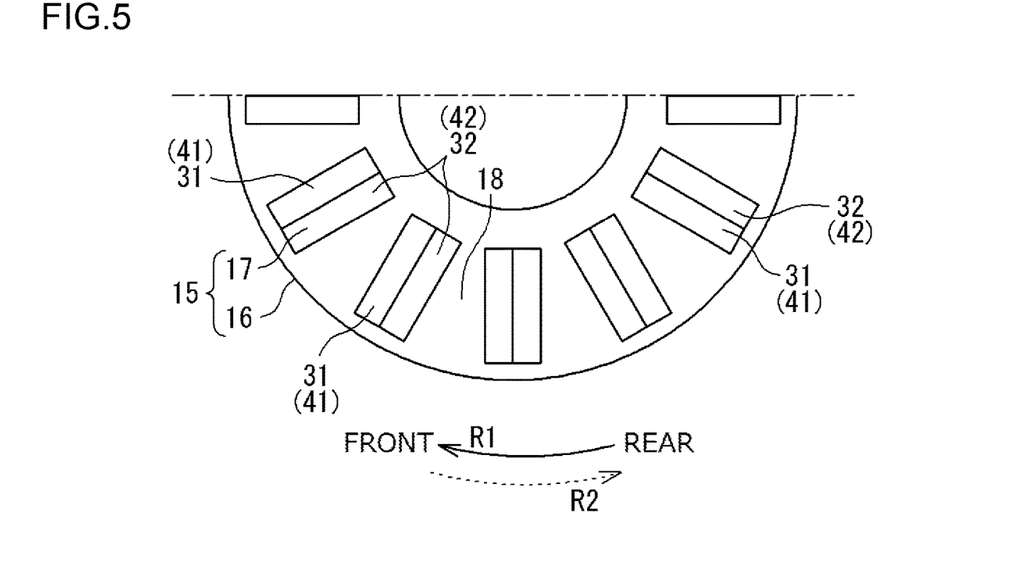
FIG. 5 is a front view illustrating the lower half of an oil discharge portion with blade portions according to a different embodiment.
Figure 6:
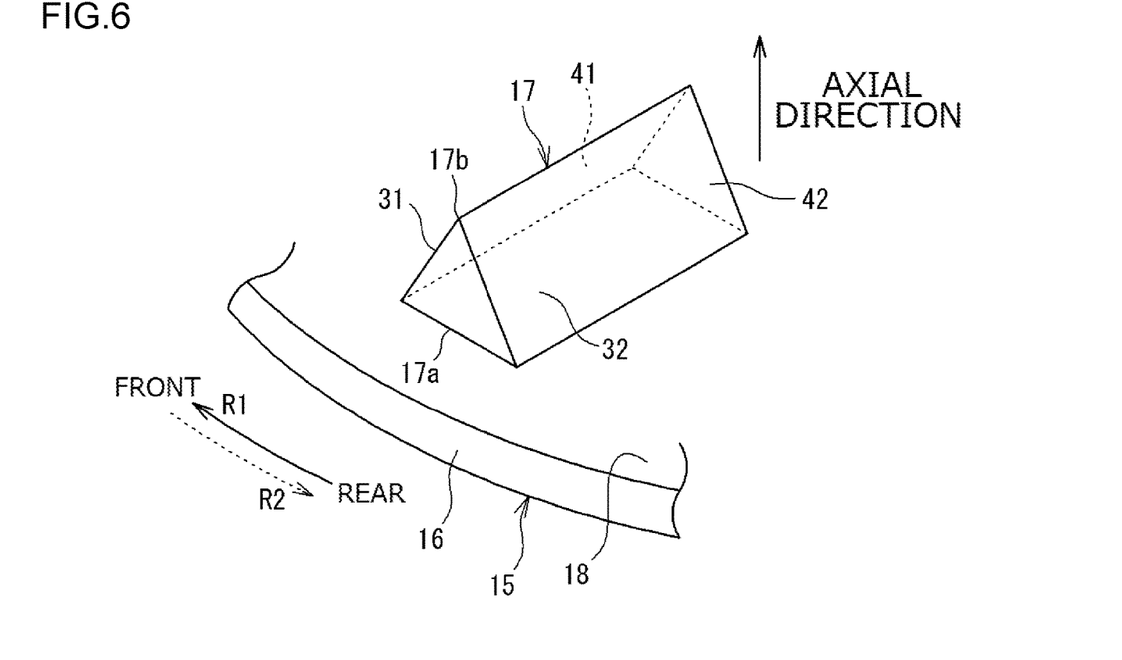
FIG. 6 is a perspective view illustrating a part of the oil discharge portion.

FIG. 5 is a front view illustrating the lower half of the oil discharge portion 15 with blade portions 17 according to a different embodiment. FIG. 6 is a perspective view illustrating a part of the oil discharge portion 15. Also in the oil discharge portion 15 illustrated in FIGS. 5 and 6, the blade portions 17 are provided on the side surface 18 of the wall portion 16 which faces one side in the axial direction. The plurality of blade portions 17 are provided on the wall portion 16 at intervals in the circumferential direction. The blade portions 17 project in the axial direction from the side surface 18. The rotational direction of the oil discharge portion 15 is indicated by the continuous arrow R1. The direction opposite to the rotational direction of the oil discharge portion 15 is indicated by the dashed arrow R2. As illustrated in FIG. 6, the blade portion 17 has a blade base portion 17a on the wall portion 16 side, and a blade tip portion 17b that extends in the axial direction from the blade base portion 17a. In each of the blade portions 17, a first side surface 41 that faces the front side in the rotational direction (direction of the arrow R1) serves as a blade surface (first blade surface) 31 that applies thrust to the lubricating oil 7. The blade surface 31 is provided so as to extend in the direction (direction of the arrow R2) opposite to the rotational direction as the blade surface 31 extends from the blade base portion 17a toward the blade tip portion 17b.

When the oil discharge portion 15 which has such blade portions 17 is rotated in the direction of the arrow R1 together with the inner ring 11, the lubricating oil 7 flows toward one side in the axial direction away from the wall portion 16 in the region K1 (see FIG. 2) on one side in the axial direction. With this flow of the lubricating oil 7 toward one side in the axial direction, the lubricating oil 7 in the space on the radially outer side of the wall portion 16 flows toward one side in the axial direction to be decreased. As a result, the lubricating oil 7 in the annular space 29 is discharged toward one side in the axial direction.

The oil discharge portion 15 illustrated in FIGS. 5 and 6 can cause the lubricating oil 7 to flow toward one side in the axial direction by applying thrust to the lubricating oil 7 around the blade portions 17, whether the inner ring 11 is rotated in one direction or the other direction. To this end, as illustrated in FIG. 6, the blade portions 17 are provided so as to project in the axial direction from the side surface 18 of the wall portion 16. As described above, the first side surface 41, which faces one side in the circumferential direction, of each of the blade portions 17 serves as the first blade surface 31 which applies thrust to the lubricating oil 7. A second side surface 42, which faces the other side in the circumferential direction, of each of the blade portions 17 serves as a second blade surface 32 that applies thrust to the lubricating oil 7. As described above, provided that the rotational direction of the oil discharge portion 15 is the direction of the arrow R1, the first blade surface 31 has a blade surface shape provided so as to extend in the direction of the arrow R2, which is opposite to the rotational direction (direction of the arrow R1), as the first blade surface 31 extends from the blade base portion 17a toward the blade tip portion 17b. Provided that the rotational direction of the oil discharge portion 15 is the direction of the arrow R2 with the inner ring 11 rotating in the opposite direction, in contrast, the second blade surface 32 is provided so as to extend in the direction of the arrow R1, which is opposite to the rotational direction (direction of the arrow R2), as the second blade surface 32 extends from the blade base portion 17a toward the blade tip portion 17b. Consequently, the oil discharge portion 15 can cause the lubricating oil 7 to flow toward one side in the axial direction by applying thrust to the lubricating oil 7 around the blade portions 17, whether the inner ring 11 is rotated in one direction or the other direction.

Each of the oil discharge portion 15 illustrated in FIG. 3 and the oil discharge portion 15 illustrated in FIG. 4 can cause the lubricating oil 7 to flow in the radial direction by applying thrust to the lubricating oil 7 around the blade portions 17, whether the inner ring 11 is rotated in one direction or the other direction. That is, in the case of the oil discharge portion 15 illustrated in FIG. 3, as described already, when the rotational direction is the direction of the arrow R1, the first blade surfaces 31 of the blade portions 17 on one side in the circumferential direction can cause the lubricating oil 7 around the first blade surfaces 31 to flow radially inward toward the rotary shaft 8. Provided that the rotational direction is inverted to the direction of the arrow R2, in contrast, the blade portions 17 have the second blade surfaces 32 as the side surfaces 42 on the other side in the circumferential direction. The second blade surfaces 32 extend in the direction of the arrow R1, which is opposite to the rotational direction (direction of the arrow R2), toward the radially outer side. The second blade surfaces 32 can cause the lubricating oil 7 around the second blade surfaces 32 to flow radially outward. With such a flow of the lubricating oil 7, the lubricating oil 7 in the annular space 29 is discharged toward one side in the axial direction.

In the case of the embodiment illustrated in FIG. 4, as described already, when the rotational direction is the direction of the arrow R1, the first blade surfaces 31 of the blade portions 17 on one side in the circumferential direction can cause the lubricating oil 7 around the first blade surfaces 31 to flow radially outward. Provided that the rotational direction is inverted to the direction of the arrow R2, in contrast, the blade portions 17 have the second blade surfaces 32 as the side surfaces 42 on the other side in the circumferential direction. The second blade surfaces 32 have a blade surface shape that extend in the direction of the arrow R1, which is opposite to the rotational direction (direction of the arrow R2), toward the radially inner side. The second blade surfaces 32 can cause the lubricating oil 7 around the second blade surfaces 32 to flow radially inward toward the rotary shaft 8. With such a flow of the lubricating oil 7, the lubricating oil 7 in the annular space 29 is discharged toward one side in the axial direction.

Figure 7:
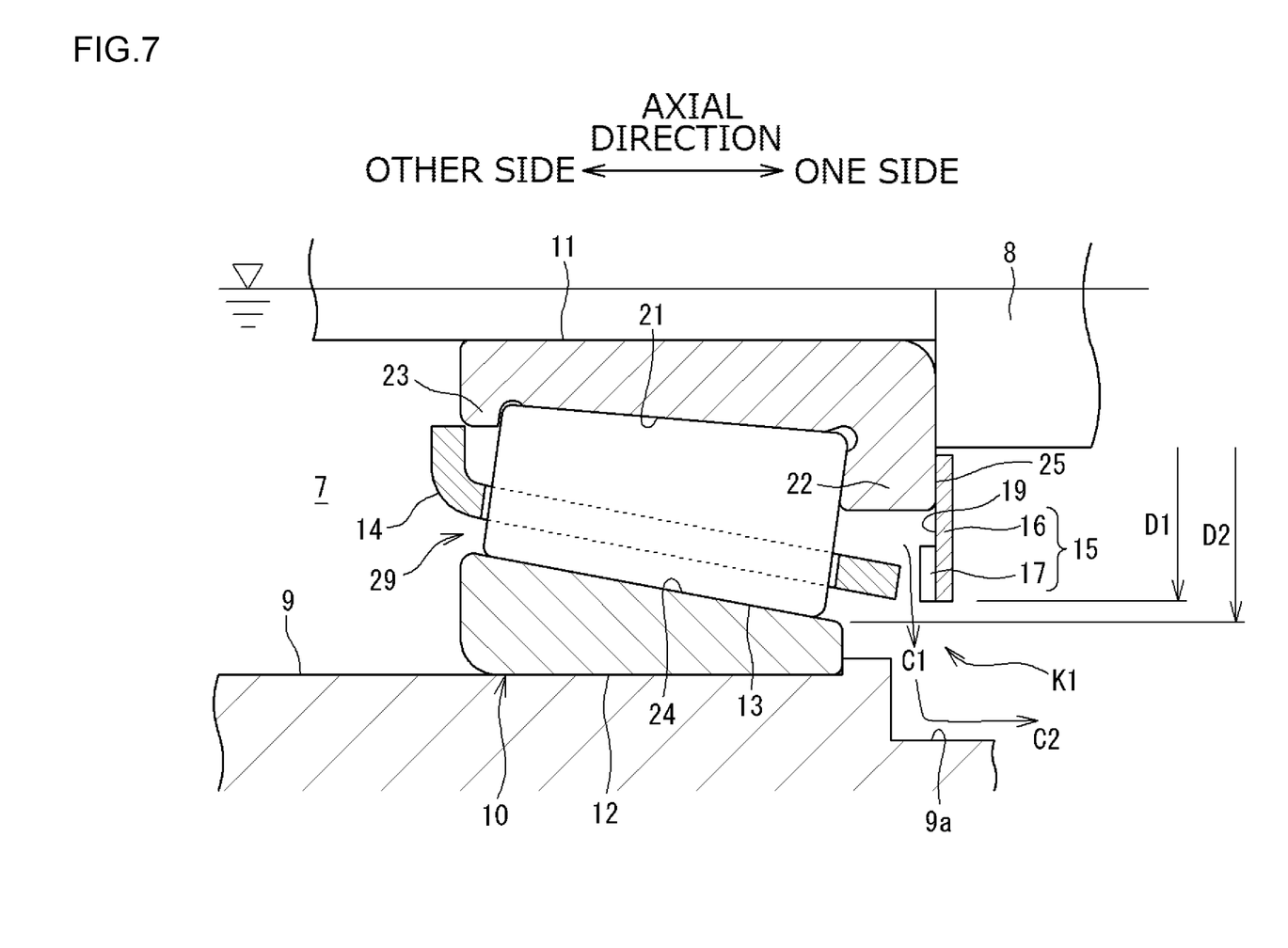
FIG. 7 is a sectional view of a rolling bearing that includes an oil discharge portion according to a different embodiment.

FIG. 7 is a sectional view of a rolling bearing 10 that includes an oil discharge portion 15 according to a different embodiment. The rolling bearing 10 illustrated in FIG. 7 is different from the rolling bearing 10 illustrated in FIG. 2 in the oil discharge portion 15. In the oil discharge portion 15 illustrated in FIG. 7, the blade portions 17 are provided on a side surface 19 of the wall portion 16 on the other side in the axial direction. In the rolling bearing 10 illustrated in FIG. 7, the extension tubular portion 20 illustrated in FIG. 2 is omitted. In addition, the inner peripheral surface of the housing 9 is shaped differently. The housing 9 preferably has a stepped shape (widened shape), in which the clearance between the oil discharge portion 15 and an inner peripheral surface 9a of the housing 9 is widened on the radially outer side of the oil discharge portion 15.

In the case of the rolling bearing 10 illustrated in FIG. 7, when the inner ring 11 is rotated together with the oil discharge portion 15, the blade portions 17 cause the lubricating oil 7 around the blade portions 17 of the oil discharge portion 15 to flow radially outward (arrow C1 in FIG. 7). To this end, the blade portions 17 are configured similarly to the blade shape illustrated in FIG. 4. It should be noted that the overall length of the blade portions 17 illustrated in FIG. 7 is shorter than that of the blade portions 17 illustrated in FIG. 4. When the blade portions 17 cause the lubricating oil 7 to flow radially outward, the lubricating oil 7 in the annular space 29 is discharged radially outward. When the lubricating oil 7 hits the inner peripheral surface 9a of the housing 9, further, the lubricating oil 7 can flow toward one side in the axial direction (arrow C2 in FIG. 7). Consequently, the lubricating oil 7 in the annular space 29 is discharged toward one side in the axial direction.

As described above, in the embodiment illustrated in FIG. 2, the blade portions 17 are provided on the side surface 18 of the wall portion 16 which faces one side in the axial direction. In this case, it is only necessary that the blade portions 17 should have a blade surface shape that causes the lubricating oil 7 to flow at least radially inward toward the rotary shaft 8, radially outward, or toward one side in the axial direction. In the case where the blade portions 17 are provided on the side surface 19 of the wall portion 16 which faces the other side in the axial direction (the annular space 29 side) as illustrated in FIG. 7, in contrast, it is only necessary that the blade portions 17 should have a blade surface that causes the lubricating oil 7 to flow radially outward.

Figure 8:
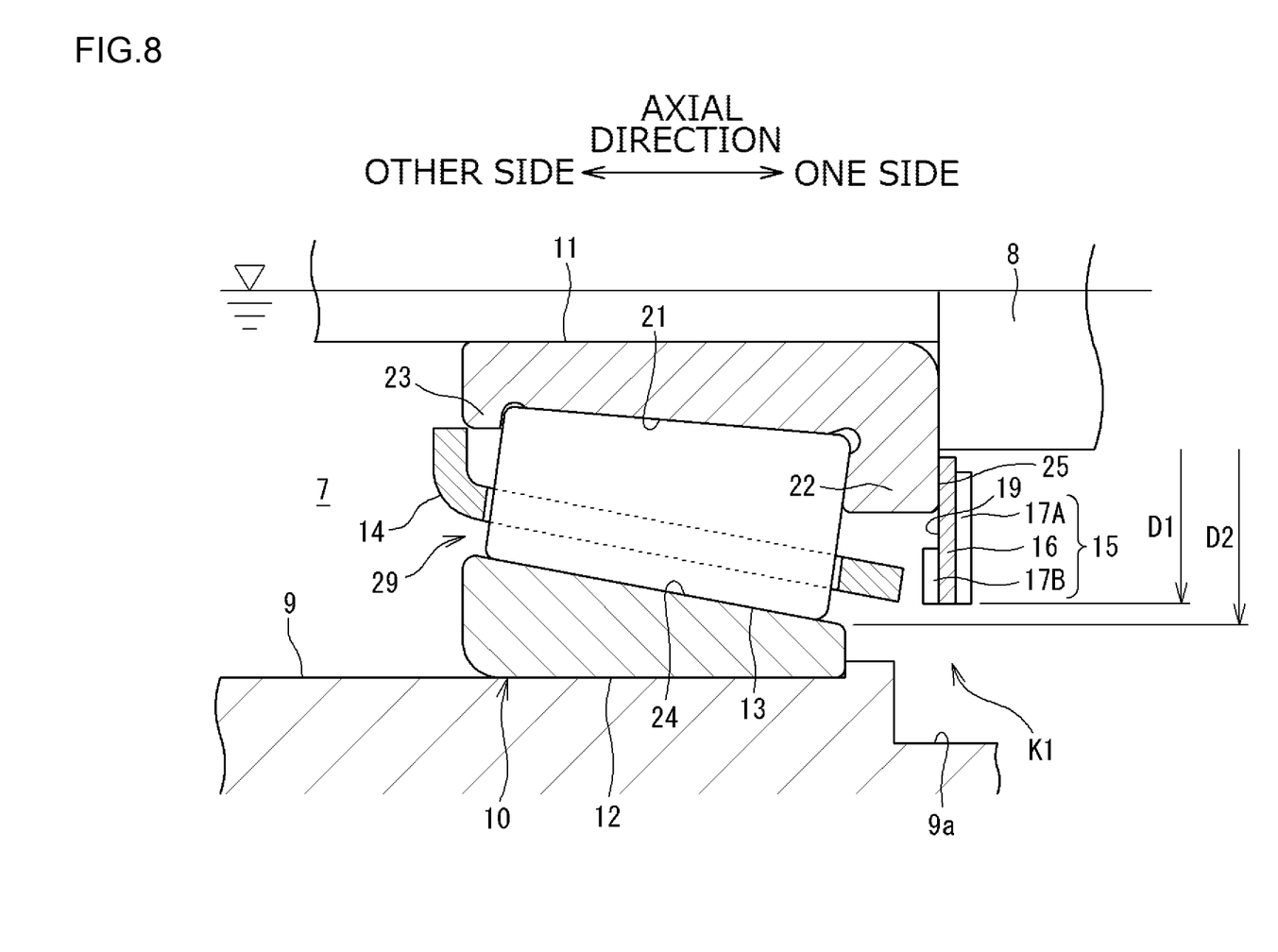
FIG. 8 is a sectional view of a rolling bearing that includes an oil discharge portion according to still another embodiment.

FIG. 8 is a sectional view of a rolling bearing 10 that includes an oil discharge portion 15 according to still another embodiment. In each of the embodiments illustrated in FIGS. 2 and 7, the blade portions 17 are provided only on one side surface 18 (or 19) of the wall portion 16. In the oil discharge portion 15 illustrated in FIG. 8, the blade portions 17 are provided on both the side surfaces 18 and 19 of the wall portion 16. That is, the oil discharge portion 15 has first blade portions 17A and second blade portions 17B. The first blade portions 17A are provided on the side surface 18 of the wall portion 16 which faces one side in the axial direction. The second blade portions 17B are provided on the side surface 19 of the wall portion 16 which faces the other side in the axial direction.

The first blade portions 17A are the same as one type of the blade portions 17 illustrated in FIGS. 3, 4, and 5 (6). The second blade portions 17B are configured similarly to the blade portions 17 illustrated in FIG. 4. It should be noted, however, that the overall length of the second blade portions 17B is shorter than that of the blade portions 17 illustrated in FIG. 4. That is, the first blade portions 17A have a blade surface shape that causes the lubricating oil 7 to flow at least radially inward toward the rotary shaft 8, radially outward, or toward one side in the axial direction when the first blade portions 17A are rotated in one direction together with the inner ring 11. The second blade portions 17B have a blade surface that causes the lubricating oil 7 to flow radially outward when the second blade portions 17B are rotated in one direction together with the inner ring 11. The oil discharge portion 15 illustrated in FIG. 8 has both the function of the oil discharge portion 15 illustrated in FIG. 2 and the function of the oil discharge portion 15 illustrated in FIG. 7.

In the rolling bearing 10 according to each of the embodiments, the blade portions 17 of the oil discharge portion 15 are provided on the side surface 18 (19) of the wall portion 16 which is directed in the axial direction. Therefore, the oil discharge portion 15 is rotated together with the inner ring 11. Consequently, the blade portions 17 can cause the lubricating oil 7 to flow at least radially inward toward the rotary shaft 8, radially outward, or toward one side in the axial direction. In the rolling bearing 10 according to each of the embodiments, when the inner ring 11 is rotated, the lubricating oil 7 in the annular space 29 flows toward one side in the axial direction because of the pump effect. Concurrently, the blade portions 17 cause the lubricating oil 7 to flow in the region K1 on one side in the axial direction (see FIGS. 2 and 7), which makes it possible to enhance the function of discharging the lubricating oil 7 in the annular space 29 toward one side in the axial direction. As a result, it is possible to suppress the lubricating oil 7, which has been discharged, being returned to the annular space 29 in the rolling bearing 10 under oil bath lubrication. Consequently, it is possible to suppress an increase in the stirring torque by reducing the amount of the lubricating oil 7 in the annular space 29.

In the case of the oil discharge portion 15 illustrated in FIGS. 3, 4, and 5 (6), the wall portion 16 is provided with the plurality of blade portions 17 at intervals in the circumferential direction so as to project in the axial direction from the side surface 18. The first side surface 41, which faces one side in the circumferential direction, of each of the blade portions 17 serves as the first blade surface 31 which applies thrust to the lubricating oil 7. The second side surface 42, which faces the other side in the circumferential direction, of each of the blade portions 17 serves as the second blade surface 32 which applies thrust to the lubricating oil 7. Therefore, it is possible to cause the lubricating oil 7 to flow as described above by applying thrust to the lubricating oil 7, whether the inner ring 11 is rotated in one direction or the other direction.

In each of the embodiments illustrated in FIGS. 3, 4, and 5 (6), the blade portion 17 which has the first blade surface 31 and the blade portion 17 which has the second blade surface 32 are the same identical member. That is, in each of the embodiments illustrated in FIGS. 3, 4, and 5 (6), one blade portion 17 has the first blade surface 31 and the second blade surface 32. In one oil discharge portion 15, however, the blade portion 17 which has the first blade surface 31 and the blade portion 17 which has the second blade surface 32 may be different from each other. That is, each of the plurality of blade portions 17 may have only one of the first blade surface 31 and the second blade surface 32.

In each of the embodiments, the oil discharge portion 15 has the wall portion 16 in a circular plate shape, and the outside diameter D1 of the wall portion 16 is larger than the outside diameter of an end portion (large rib 22) of the inner ring 11 on one side in the axial direction. Therefore, the wall portion 16 can cover the annular space 29 from the axial direction, which allows the wall portion 16 to suppress the lubricating oil 7, which has been discharged to one side in the axial direction with respect to the wall portion 16, being returned to the annular space 29.

In the case of the embodiment illustrated in FIG. 2, further, the outer ring 12 has the extension tubular portion 20 which extends in the axial direction toward one side in the axial direction. The gap e is formed between the wall portion 16 and the extension tubular portion 20. With this configuration, the gap e can suppress the lubricating oil 7, which has been discharged from the annular space 29 toward one side in the axial direction, being returned to the annular space 29 again.

In the rolling bearing 10 illustrated in FIG. 1, an oil discharge portion 15 is provided on the large end side of the inner ring 11 of the bearing portion on the right side. An oil discharge portion 15 is also provided on the large end side of the inner ring 11 of the bearing portion on the left side. That is, the oil discharge portions 15 and 15 are provided on both sides, in the axial direction, of the rolling bearing 10 which is a double-row tapered roller bearing. Therefore, when the inner ring 11 is rotated, the lubricating oil 7 in the annular space 29 between the inner ring 11 and the outer ring 12 is discharged out of the bearing. As a result, the oil discharge portions 15 and 15 maintain a state in which there is less lubricating oil 7 in the annular space 29 (compared to a non-rotating state). Therefore, it is possible to reduce the stirring torque (stirring resistance) due to the lubricating oil 7 of the rolling bearing 10.

Figure 9:
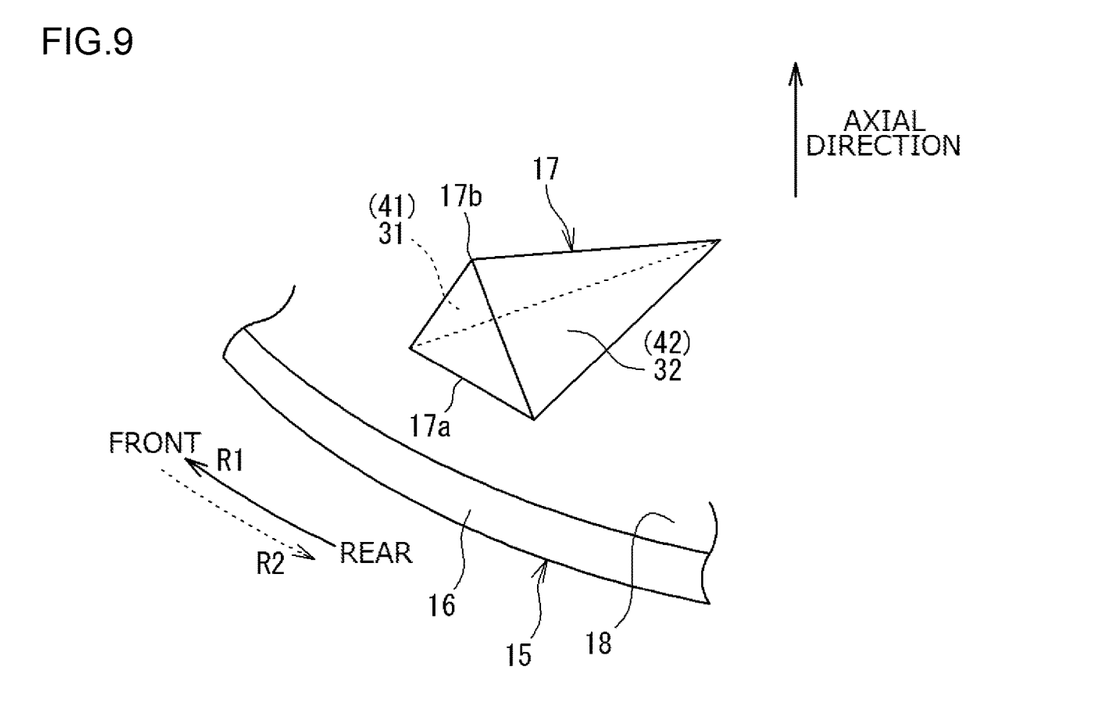
FIG. 9 is a perspective view illustrating a part of an oil discharge portion according to a different embodiment.
Figure 10:
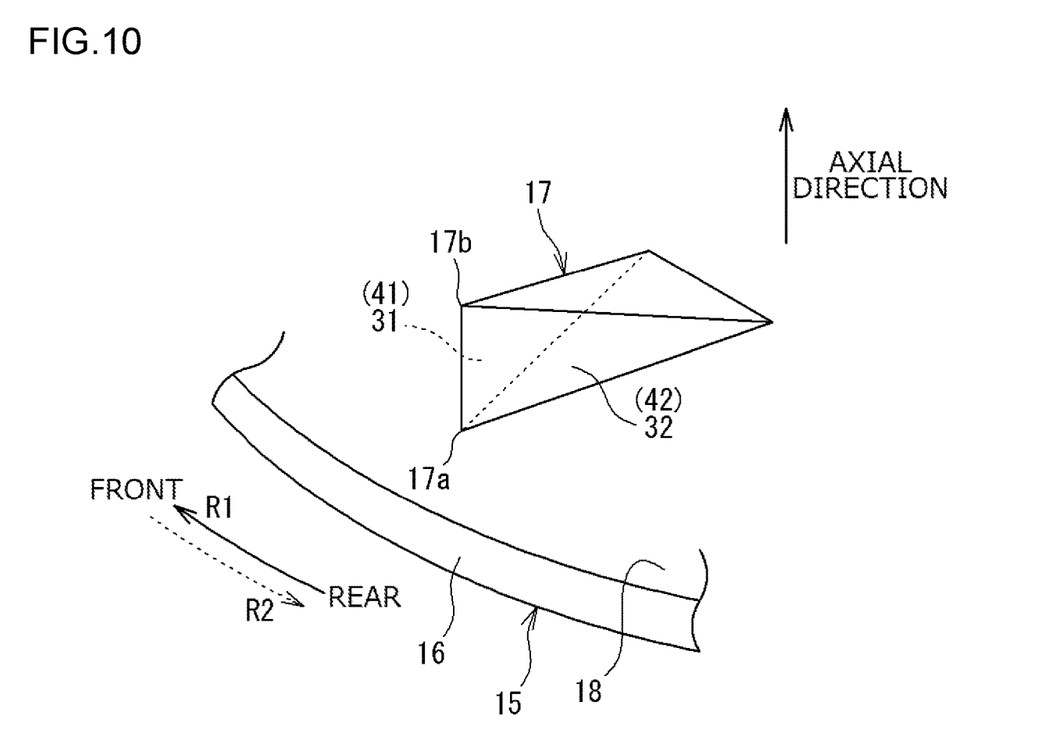
FIG. 10 is a perspective view illustrating a part of an oil discharge portion according to a different embodiment.

The blade portions 17 may be different from those according to the illustrated embodiments. As illustrated in FIGS. 9 and 10, for example, the blade portions 17 may have a triangular pyramid shape. The blade portion 17 illustrated in FIG. 9 has a first blade surface 31 on the front side in the rotational direction (direction of the arrow R1). The first blade surface 31 extends in the direction (direction of the arrow R2) opposite to the rotational direction toward the radially inner side. In this case, when the inner ring 11 is rotated in the direction of the arrow R1, as in the embodiment illustrated in FIG. 3, the lubricating oil 7 flows radially inward toward the rotary shaft 8 (see FIG. 2).

The blade portion 17 illustrated in FIG. 9 also functions when the rotational direction is inverted to the direction of the arrow R2. That is, the blade portion 17 has the first blade surface 31 on the first side surface 41 on one side in the circumferential direction, and also has the second blade surface 32 on the second side surface 42 on the other side in the circumferential direction. The second blade surface 32 extends in the direction (direction of the arrow R1) opposite to the rotational direction toward the radially inner side. Consequently, when the inner ring 11 is rotated in the direction of the arrow R2, the lubricating oil 7 flows radially inward toward the rotary shaft 8 (see FIG. 2).

The blade portion 17 illustrated in FIG. 10 has a first blade surface 31 on the front side in the rotational direction (direction of the arrow R1). The first blade surface 31 extends in the direction (direction of the arrow R2) opposite to the rotational direction toward the radially outer side. In this case, when the inner ring 11 is rotated in the direction of the arrow R1, as in the embodiment illustrated in FIG. 4, the lubricating oil 7 flows radially outward.

The blade portion 17 illustrated in FIG. 10 also functions when the rotational direction is inverted to the direction of the arrow R2. That is, the blade portion 17 has the first blade surface 31 on the first side surface 41 on one side in the circumferential direction, and also has the second blade surface 32 on the second side surface 42 on the other side in the circumferential direction. The second blade surface 32 extends in the direction (direction of the arrow R1) opposite to the rotational direction toward the radially outer side. Consequently, when the inner ring 11 is rotated in the direction of the arrow R2, the lubricating oil 7 flows radially outward.

In the blade portions 17 illustrated in FIGS. 9 and 10, provided that the rotational direction is the direction of the arrow R1, the first blade surface 31 is also provided so as to extend in the direction (direction of the arrow R2) opposite to the rotational direction as the first blade surface 31 extends from the blade base portion 17a toward the blade tip portion 17b. Therefore, it is also possible to generate a component that causes the lubricating oil 7 to flow in the axial direction when the inner ring 11 is rotated. Provided that the rotational direction is the direction of the arrow R2, the second blade surface 32 is also provided so as to extend in the direction (direction of the arrow R1) opposite to the rotational direction as the second blade surface 32 extends from the blade base portion 17a toward the blade tip portion 17b. Therefore, it is also possible to generate a component that causes the lubricating oil 7 to flow in the axial direction when the inner ring 11 is rotated.

Also in the blade portions 17 illustrated in FIGS. 3 and 4, the first blade surface 31 may be provided so as to extend in the direction (direction of the arrow R2) opposite to the rotational direction as the first blade surface 31 extends from the blade base portion 17a toward the blade tip portion 17b. Provided that the rotational direction is the direction of the arrow R2, the second blade surface 32 may also be provided so as to extend in the direction (direction of the arrow R1) opposite to the rotational direction as the second blade surface 32 extends from the blade base portion 17a toward the blade tip portion 17b.

The rolling bearing 10 according to each of the embodiments is a tapered roller bearing in which the tapered rollers 13 are used as the rolling elements. However, the rolling bearing 10 may be of a different type (whether the pump effect is caused or not), and may be a ball bearing, for example. The rolling elements may be cylindrical rollers, rather than balls. Also in a ball bearing, although not illustrated, the stirring torque is increased if much lubricating oil is present in an annular space between an inner ring and an outer ring. However, the lubricating oil in the annular space can be discharged in the axial direction by providing the inner ring with the oil discharge portion 15 such as that described above. As a result, it is possible to reduce the stirring torque.

The embodiments disclosed above are exemplary in all respects, and are not limiting. That is, the rolling bearing according to the present invention is not limited to the illustrated embodiments, and may be in other embodiments without departing from the scope of the present invention.

According to the present invention, it is possible to enhance the function of discharging lubricating oil in an annular space toward one side in the axial direction with the blade portions causing the lubricating oil to flow in a region on one side in the axial direction when an inner ring is rotated.

What is claimed is:

1. A rolling bearing comprising:
   an inner ring that rotates together with a rotary shaft;
   an outer ring;
   a plurality of rolling elements provided between the inner ring and the outer ring; and
   an oil discharge portion provided on a first side of the inner ring in a first axial direction extending from the inner ring to the oil discharge portion to rotate together with the inner ring, wherein
   the oil discharge portion has
      a wall portion in a circular plate shape that partially covers an annular space formed between the inner ring and the outer ring, and
      a plurality of blade portions that are provided on a side surface of the wall portion and that rotate together with the inner ring to cause lubricating oil to flow at least radially inward, radially outward, or in the first axial direction, wherein the side surface of the wall portion on which the plurality of blade portions are provided is a side surface of the wall portion that faces in the first axial direction.

2. The rolling bearing according to claim 1, wherein:
   the plurality of blade portions are provided on the wall portion at intervals in a circumferential direction to project in the first axial direction from the side surface;
   a first side surface, which faces one side in the circumferential direction, of each of the blade portions serves as a first blade surface that applies thrust to the lubricating oil; and
   a second side surface, which faces the other side in the circumferential direction opposite the one side in the circumferential direction, of each of the blade portions serves as a second blade surface that applies thrust to the lubricating oil.

3. The rolling bearing according to claim 1, wherein:
   the oil discharge portion has first blade portions provided on the side surface of the wall portion that faces in the first axial direction, and second blade portions provided on the side surface of the wall portion that faces in a second axial direction opposite to the first axial direction;
   the first blade portions each have a blade surface shape that causes the lubricating oil to flow at least radially inward, radially outward, or in the first axial direction when the first blade portions are rotated in one direction together with the inner ring; and
   the second blade portions each have a blade surface that causes the lubricating oil to flow radially outward when the second blade portions are rotated in the one direction together with the inner ring.

4. The rolling bearing according to claim 1, wherein the outer ring has an extension tubular portion that extends in the first axial direction farther than an outer side surface of the inner ring in the first axial direction, and a gap is formed between the wall portion and the extension tubular portion.

5. The rolling bearing according to claim 1, wherein the blade portions each have a blade surface that extends in a direction opposite to a rotational direction of the inner ring toward a radially inner side.

6. The rolling bearing according to claim 1, wherein the blade portions each have a blade surface that extends in a direction opposite to a rotational direction of the inner ring toward a radially outer side.

7. The rolling bearing according to claim 1, wherein the blade portions each have a blade surface provided so as to extend in a direction opposite to a rotational direction of the inner ring as the blade portion extends in the first axial direction from a blade base portion on a side of the wall portion toward a blade tip portion on a distal end side.

* * * * *